Sept. 12, 1950 I. E. GROSDOFF 2,521,789

FREQUENCY CONTROL BY ELECTRONIC COUNTER CHAINS

Filed Feb. 25, 1948 2 Sheets-Sheet 1

INVENTOR

IGOR E. GROSDOFF

BY Morris L. Rabkin

ATTORNEY

INVENTOR
Igor E. Grosdoff
BY Maurice Rabkin
ATTORNEY

Patented Sept. 12, 1950 2,521,789

UNITED STATES PATENT OFFICE 2,521,789

FREQUENCY CONTROL BY ELECTRONIC COUNTER CHAINS

Igor E. Grosdoff, Princeton, N. J., assignor to Radio Corporation of America, a corporation of Delaware Application February 25, 1948, Serial No. 10,665

5 Claims. (Cl. 250—36)

This invention relates to automatic frequency control systems such as are adapted to maintain a predetermined relation between the output frequencies of a variable frequency generator and a constant or standard frequency generator.

Heretofore there have been proposed automatic frequency control systems wherein the output frequency of a variable frequency generator is regulated with crystal accuracy and at different values by comparing two series of pulses having substantially the same frequency. One of these series of pulses is supplied from a constant frequency generator through a frequency divider having a fixed division ratio. The other of these series of pulses is supplied from the variable frequency generator through a frequency divider which is adjusted so that its output frequency is substantially equal to that of the fixed frequency divider. These two substantially equal frequencies are applied to a detector, such as a phase comparator or the like, which controls the reactance tube or other frequency determining element of the variable frequency generator in such a way as to maintain the frequency of the variable frequency generator substantially constant at any one of its adjusted values. Automatic frequency control systems of this type are disclosed in the copending applications of Charles J. Young, Ser. No. 719,035, filed December 28, 1946, issued as Patent No. 2,490,500 on December 6, 1948, and John D. Woodward, Ser. No. 743,234, filed April 23, 1947, issued as Patent No. 2,490,499 on December 6, 1949. The details of the variable frequency generator are disclosed in a copending application of Olin L. MacSorley, Ser. No. 743,-266, filed April 23, 1947.

The present invention accomplishes the same result as the systems of the aforesaid applications of Young and Woodward but differs from those systems in that the fixed and adjustable frequency dividers of those systems are replaced by a single frequency divider. To this single frequency divider, the outputs of the fixed and variable frequency generators are applied alternately in such a way as to produce at the output of the frequency divider a square wave from which a unidirectional component is extracted and utilized to regulate the frequency of the variable frequency generator. As hereinafter explained, the single frequency divider of the present invention is provided with control circuits which enable it to present different capacities to the alternately applied frequencies of the fixed and variable frequency generators. The term "capacity," as here used in connection with the frequency divider, is intended to indicate the number of pulses required to complete the operating cycle of the frequency divider under the particular condition established by its control circuits.

The principal object of the invention is to provide an improved automatic frequency control system and method of operation which involve fewer parts and is of simpler construction than the similar systems heretofore available. Important objects of the invention are (1) the provision of a frequency divider provided with control circuits such that it presents one capacity to input pulses of one frequency and another capacity to input pulses of another frequency, and (2) the provision of a frequency divider with means for alternately selecting output pulses from different sources.

The invention will be better understood from the following description considered in connection with the accompanying drawings and its scope is indicated by the appended claims.

Referring to the drawings:

Fig. 1 is a box diagram of a first form of the invention wherein the pulses from the fixed and variable frequency generators are alternately supplied to adjustable parts of the output section of the frequency divider through switches each arranged to select any desired number of stages of the frequency divider. Under these conditions, there is presented to each of the generators a frequency divider capacity which is determined by the position of the switch to which it is connected.

Fig. 2 is a box diagram illustrating a second form of the invention wherein the output pulses of the two generators are applied alternately to the input of the frequency divider and are delivered from the frequency divider through switches capable of adjusting the frequency divider to produce different division ratios or capacities. This form of the invention also includes means for automatically resetting the frequency divider to its zero or standby condition at the end of each group of pulses delivered from each of the generators.

Fig. 3 is a box diagram illustrating a third form of the invention wherein the output pulses of the two generators are supplied alternately to the input of the frequency divider and are delivered at the output of the frequency divider. In this form of the invention, the two frequency divider capacities or division ratios are controlled by feedback connections between the different stages of the frequency divider, such feed back connections being under the control of the output of the frequency divider.

Figure 1:
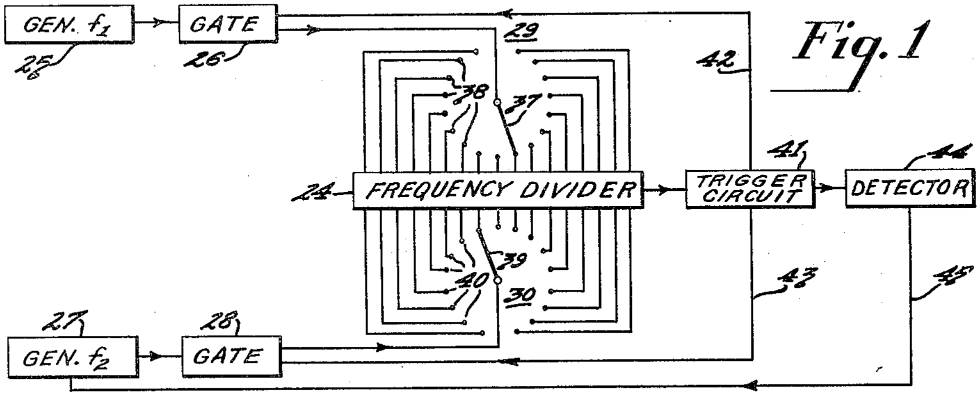

It will be noted that each of the four modifications of the invention include a frequency divider 24 having means for changing its capacity so that its cycle of operation is completed in response to any selected number of input pulses delivered from a constant frequency generator 25 through a gate 26 or from a variable frequency generator 27 through a gate 28. The term "gate" is used herein to indicate any device which conducts pulses in response to one control potential and is made nonconductive in response to another control pulse. It may be a multi-grid vacuum tube to one control grid of which are applied the pulses and to another control grid of which are applied the control potentials.

The frequency divider is preferably of the type wherein a plurality of trigger circuits are connected in cascade. The details of such a frequency divider are shown in the central part of Fig. 5 and its various characteristics are discussed in connection with this figure.

Figure 2:
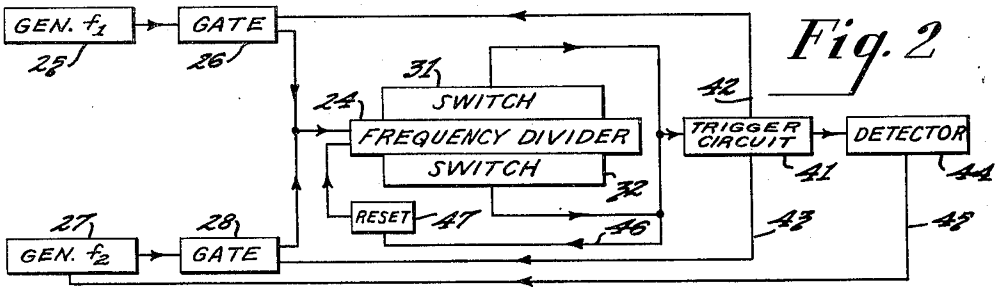
Figure 3:
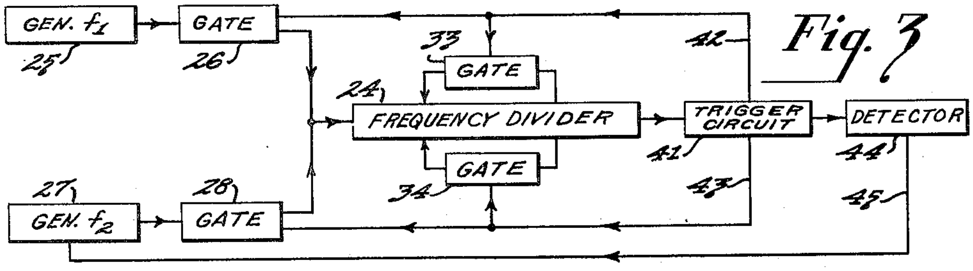
Figure 4:
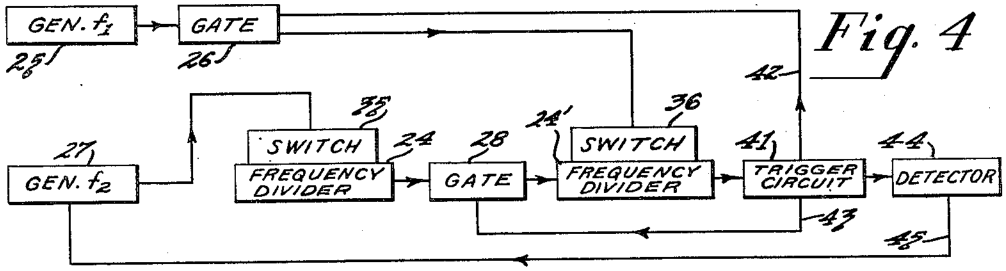
Fig. 4 is a box diagram illustrating a fourth form of the invention wherein the frequency divider is split into separate sections each of which has an adjustable capacity. In this form of the invention, the output pulses of the two generators are alternately supplied to an adjustable number of stages at the output ends of the frequency divider sections.

The means for varying the capacity of the frequency divider are shown (1) as switches 29 and 30 in Fig. 1, (2) as switches 31 and 32 in Fig. 2, (3) as gates 33 and 34 in Fig. 3, and (4) as switches 35 and 36 in Fig. 4.

The switch 29 includes a movable contact member 37 adapted successively to engage a series of fixed contact members 38. Similarly, the switch 30 includes a movable contact member 39 adapted successively to engage a series of fixed contact members 40. The fixed contact members 38 and 40 are connected to leads corresponding to the anode leads 70 to 77 of Fig. 5.

By suitable positioning of the switch member 37, the frequency divider 24 may be made to complete its cycle of operation in response to any desired number of pulses applied to it from the generator 25 through the gate 26. In the same manner the switch 30 is effective to make the frequency changer 24 complete its cycle of operation in response to any desired number of pulses applied to it from the generator 27 through the gate 28.

Figure 5:
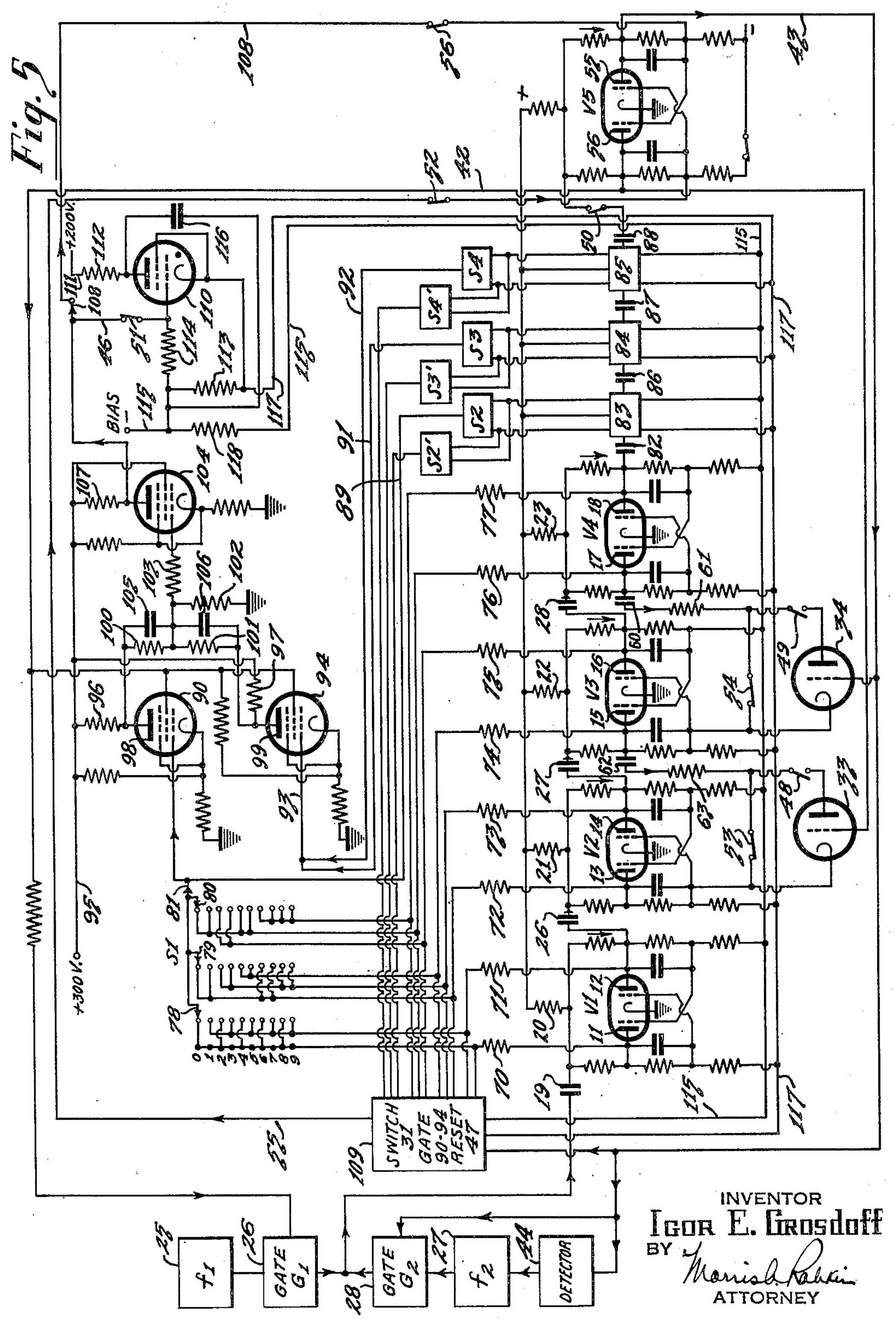
Fig. 5 is a wiring diagram including switches which may be manually operated to put the automatic frequency control system into the form of Fig. 2 or Fig. 3. With these manually operated switches positioned as in Fig. 5, the system is in the form of Fig. 2.

Each time the frequency divider 24 completes its cycle of operation, a negative pulse is applied from it to a trigger circuit 41 which may be similar to the trigger circuit V1 of Fig. 5. The trigger circuit 41 is so connected to the gates 26 and 28 that these gates are never both open or closed at the same time. Thus with the trigger circuit 41 in one of its stable operating conditions, a positive potential is applied through a lead 42 to open the gate 26 and a negative pulse is applied through a lead 43 to close the gate 28. When the trigger circuit 41 is in its other stable operating condition, the potentials of the leads 42 and 43 are reversed, the gate 26 is closed and the gate 28 is open.

When the trigger circuit 41 is in one of its stable operating conditions, a positive potential is applied from it to a detector 44. When the trigger circuit 41 is in the other of its stable operating conditions a negative potential is applied from it to the detector 44.

Thus the connections may be such that (1) a negative potential is applied to the detector 44 while pulses are supplied from the generator 25 through the gate 26 and the switch 29 to the frequency divider 24 and (2) a positive potential is applied to the detector 44 while pulses are supplied from the generator 27 through the gate 28 and the switch 30 to the frequency divider 24.

It is easy to see that the positive potential applied to the detector 44 is in the form of a square wave covering a time interval dependent on the frequency of the pulses delivered from the generator 27. Thus, if the frequency of the generator 27 tends to increase, the period of the square wave is shortened and vice versa. The time interval between the positive square waves is constant for the reason that the output frequency of the generator 25 is constant. The positive square waves are detected by the detector 44 and applied through a lead 45 to the frequency control element of the generator 27 in such a way as to maintain a substantially constant relation between the output frequencies of the two generators.

Thus assuming that the capacity of the frequency divider 24 is alternately changed with the frequencies of the pulses applied to it from the different generators, as explained above, the positive and negative loops of the square wave applied from the trigger circuit 41 to the detector 44 are the direct functions of the frequency divider capacities $N_1$ and $N_2$ and inverse functions of the freqencies $f_1$ and $f_2$ of the generators 25 and 27. The time lengths of these negative and positive loops are $$\frac{N_1}{1} \text{ and } \frac{N_2}{2}$$

An equation connecting the two loops is $$\frac{N_1}{f_1}=K\frac{N_2}{f_2} \qquad (1)$$

where K is an arbitrary constant determining the level of the D.-C. component. It can be seen that, for $K=1$ and $N_1=N_2$, $f_1$ must be equal to $f_2$ in order to obtain a symmetrical square wave, and that any change in either frequency would destroy this symmetry. Also it can be seen that by changing $N_1$ and $N_2$ the same result is obtained. Therefore, Equation 1 can be rewritten as $$\frac{N_1}{N_2}=\frac{f_1}{f_2} \qquad (2)$$

which means that basically the ratio of the two capacities $N_1$ and $N_2$ of the frequency divider 24 must be the same as the ratio of the two frequencies $f_1$ and $f_2$ of the generators 25 and 27. It also means that, for any selected ratio $$\frac{f_1}{f_2}$$

the capacity of the frequency divider must be changed from $N_1$ and $N_2$ and back again depending on which frequency is supplied to the frequency divider. As explained above the changes in $N_1$ and $N_2$ are effected by the switches 29 and 30 and the selection of $f_1$ and $f_2$ are made by the gates 26 and 28 in response to operation of the trigger circuit 41.

The switches 31 and 32 of Fig. 2 are of a type described in detail in connection with Fig. 5. They are so interconnected with the frequency changer 24 as (1) to adjust the two capacities of the frequency divider, and (2) to deliver an output pulse to the trigger circuit 44 when either operating cycle of the frequency changer is completed. Also at the end of each operating cycle, a control pulse is applied through a lead 46 to a reset device 47 by which the frequency changer 24 is reestablished in its zero or standby condition. The trigger circuit, in the case of Fig. 2, is operated in a manner explained in connection with the trigger circuit V5 of Fig. 5. Otherwise, the operation of the form of the invention shown by Fig. 2 is the same as that of Fig. 1.

The modification of Fig. 3 is like that of Fig. 1 with the exception that (1) pulses from the generators 25 and 27 are applied to the first stage (as in the case of Fig. 2) and (2) the two capacities of the frequency divider are controlled by the gates 33 and 34 which are controlled from the trigger circuit 41 in the same way as the gates 26 and 28. While only two gates and two feedback connections have been shown, it is apparent that there will be provided as many such gates and feedback connections as are required to accommodate the range of frequencies over which the generator 27 is to be operated.

The modification of Fig. 4 differs from those of the preceding figures in that the frequency divider is split into sections 24 and 24′ between which is connected the gate 28. The switch 35 may be like the switch 30 of Fig. 1 and the switch 36 may be like the switch 29 of Fig. 1. Under these conditions, pulses are supplied alternately (1) from the generator 25 through the gate 26 and the switch 36 to the frequency divider section 24′ and (2) from the generator 27 through the switch 35 the frequency divider section 24 and the gate 28 to the frequency divider section 24′. Each time the section 24′ completes its operating cycle, a control pulse is applied to the trigger circuit 41 as indicated above and the section 24 is returned to its zero or standby condition. Section 24 likewise returns to its zero or standby condition each time it completes its cycle of operation.

Assuming the generator 27 of Fig. 4 to be operating at a relatively high frequency and the generator 25 to be operating at a relatively low frequency, the modification of Fig. 4 has the advantage that the higher frequency is easily reduced to a value convenient for operation of the system. If the generator 25 is operating at the higher frequency, it should be connected to the switch 35 and the generator 27 should be connected to the switch 36.

In the wiring diagram of Fig. 5, the same references are used, insofar as is convenient, to indicate parts which correspond to parts of the preceding figures. The frequency divider 24 of Figs. 1 to 3 appears in Fig. 5 as four frequency divider sections. The first section includes the trigger circuits V1 to V4. The second, third and fourth sections are like the first and are shown as boxes 83, 84 and 85. By means of feedback connections 61 and 63, each section is adapted to reduce its input frequency in the ratio of one to 10. Thus for each 10,000 pulses delivered through the input capacitor 19 there could be delivered at the output capacitor 82 of the first section 1000 pulses, at the output capacitor 86 of the second section 100 pulses, at the output capacitor 87 of the third section 10 pulses and at the output capacitor 88 of the fourth section 1 pulse. Otherwise stated, the frequency divider as illustrated by Fig. 5 is capable of reducing the input frequency in the ratio of 1 to 10,000.

The extent to which this frequency reducing capability is utilized is dependent (1) on the condition of the switches 31 and 32 if the system is connected as illustrated by Fig. 2 or (2) on the condition of the gates 33 and 34 in the feedback connections if the system is connected as illustrated by Fig. 3.

In Fig. 5, the switch 31 of Fig. 2 is represented by the switches S1 to S4 and the gates 90, 94 and 104. The tube 110 functions as a part of the reset device 47. The switch 32 of Fig. 2 has the same connections as the switch 31 and is shown as a box 109 and the selector switches S2′ to S4′.

With the manually operable switches 48 to 50 open and the manually operable switches 51 to 54 closed as illustrated in Fig. 5, the system is connected as indicated in Fig. 2. With the switches 48 to 50 closed and the switches 51 to 54 open, the system of Fig. 5 is connected as indicated in Fig. 3.

Detailed consideration of the connections and operation of the system of Fig. 5 should be based on an understanding of the characteristics of the various trigger circuits which it includes.

Each of these trigger circuits is illustrated as including a pair of triodes each of which (1) has its anode coupled to the grid of the other through a resistor shunted by a capacitor, (2) has its cathode grounded, (3) has bias potential applied to its grid through a separate resistor, and (4) has operating potential applied to its anode through a separate resistor and a resistor which is common to the anodes of both triodes.

With these connections, only one of the triodes conduct current at a time. Current conduction is transferred from one to the other of the triodes in response (1) to the application of a negative pulse to the grid of a triode which is conducting, (2) to the application of a positive pulse to the grid of a triode which is not conducting or (3) to the application of a negative pulse to the lead through which the separate anode resistors are connected to the common anode resistor.

The selector switches S1 to S4 for producing a desired control effect in response to different numbers of pulses applied to the input of the different sections of the frequency divider is a three point switch which is moved over three series of fixed contacts which are each connected to a different anode of the section through a resistor. These connections between the anodes and the fixed contacts of the switch are so arranged that the switch delivers a positive control potential only in response to a number of section input pulses determined by the setting of the switch.

The output terminals of the selector switches of the various sections are connected to a control circuit which functions to deliver a control potential only in response to the number of input pulses which is determined by the setting of the selector switches. In the Fig. 2 form of the invention, this control potential is utilized to reset the various sections to their standby condition and to change the operating condition of the trigger circuit 41 which is indicated in Fig. 5 by the reference numeral V5.

Input pulses are applied to the first section through a coupling capacitor 19. This section includes four trigger circuits V1 to V4 which are connected in tandem through coupling capacitors 26, 27 and 28. Operating potential is applied to the anodes of the trigger circuits V1 to V4 respectively through common anode resistors 20 to 23. The anodes of the different trigger circuits are indicated respectively by the reference numerals 11 and 12, 13 and 14, 15 and 16 and 17 and 18. It will be noted that (1) the anode 15 of the trigger circuit V3 is coupled through a capacitor 62 and a resistor 63 to the right-hand grid of the trigger circuit V2 and (2) the anode 17 of the trigger circuit V4 is coupled through a capacitor 60 and a resistor 61 to the right-hand grid of the trigger circuit V3. In the standby condition of the section, current conduction is in the right-hand triode of each trigger circuit as indicated by arrows adjacent the separate anode resistors.

The operating cycle of the section is indicated by the following tabulation:

| Pulse | V1 | V2 | V3 | V4 |
|---|---|---|---|---|
| 0 | R | R | R | R |
| 1 | L | R | R | R |
| 2 | R | L | R | R |
| 3 | L | L | R | R |
| 4 | R | R | L | R |
| | | L | | |
| 5 | L | L | L | R |
| 6 | R | R | R | L |
| | | | L | |
| 7 | L | R | L | L |
| 8 | R | L | L | L |
| 9 | L | L | L | L |
| 10 | R | R | R | R |

In this tabulation, the number of applied input pulses is indicated by the numerals of the first column, the letter R indicates that current conduction is in the right triode of the trigger circuit, and the letter L indicates that current conduction is in the left triode of the trigger circuit. It will be noted that after the fourth input pulse V2 is turned back left when V3 turns left and that V3 is similarly turned left when V4 turns left.

The anodes 11 to 18 of the section are connected respectively through resistors 70 to 77 to the fixed contacts of a selector switch S1. Movable contacts 78, 79 and 80 are arranged so that each moves along a different row of these fixed contacts. By comparing the arrangement of the fixed contacts with the above tabulation, it is easy to see that the most positive pulse is applied to the output lead 81 of the switch S1 only when the number of input pulses applied to the decade corresponds to the switch position indicated by the numerals at the left-hand side of the fixed contacts.

Thus if the movable contacts 78 to 80 are in the "4" position, for example, the switch output lead 81 is connected to the anodes 12, 16 and 17. As shown by the tabulation, all these anodes are not conducting and at a relatively high positive potential at the count of 4. In the same way, the lead 81 is made more positive at the proper count for any other setting of the switch S1.

The decade V1 to V4 has its output coupled through a capacitor 82 to a similar decade 83. Subsequent decades 84 and 85 are similarly connected in tandem with the first two stages through capacitors 86 and 87. Additional decades may be likewise connected through a capacitor 88.

The selector switch S2 is connected through a lead 89 to the output lead 81 of the selector S1 and thence to the control grid of a pentode 90. The selector switches S3 and S4 of the decades 84 and 85 are connected through leads 91 and 92 and a common lead 93 to the control grid of a pentode 94.

Operating potential is applied from a lead 95 respectively through resistors 96 and 97 to the anodes 98 and 99 of the pentodes 90 and 94.

When a more positive potential is applied from all the selector switches S1 to S4 to the grids of the pentodes 90 and 94, current is drawn through the resistors 96 and 97 and the potentials of the anodes 98 and 99 is made more negative. These anodes are connected to ground through separate resistors 100 and 101 and a common resistor 102 so that such more negative potential of the anodes is applied through a resistor 103 to the control grid of a pentode 104. Capacitors 105 and 106 may be connected in shunt to the resistors 100 and 101 for increasing the speed of operation.

When the grid potential of the pentode 104 is made more negative, less current is drawn through its anode resistor 107 and a positive pulse is applied through the output lead 108 to the right hand grid of V5, and to the input lead 46 of the circuit by which the various sections are reset to their zero or standby condition.

The reset circuit includes a gas tetrode 110 which derives its operating potential from a lead 111 through a resistor 112. The cathode and control grid of the tetrode 110 are connected respectively through a resistor 113 and a resistor 114 to a negative lead 115 through which bias potential is applied to the various grids of the sections.

Connected between the anode and cathode of the tetrode 110 in series with the resistor 113 is a capacitor 116 which is charged during the normal non-conducting state of the tetrode 110. When the previously mentioned positive pulse is applied to the grid of the tetrode 110 through the lead 46 and the switch 51, the tetrode becomes conductive and the capacitor is discharged through the resistor 113. As a result, a positive pulse is applied to the reset lead 117 of the various sections which are thereby put into their standby condition. For normally setting the bias potentials applied to the decade grids a resistor 118 may be connected in the lead 115 as indicated.

The application of the positive potential from the anode of the tube 104 through the lead 108 and switch 56 to the left hand grid of the trigger circuit V5 (41 in Fig. 2) causes current conduction to be transferred from the anode 55 to the anode 56 thus producing at this anode a more negative potential which is applied through the lead 42 (1) to the gate 26 thereby interrupting the supply of pulses from the generator 25 and (2) to the second grids of the tubes 90 and 94 thereby rendering the switches S1 to S4 ineffective to provide any potential which can affect the operation of the reset tube 110 or that of the trigger circuit V5.

The transfer of current conduction from the anode 55 to the anode 56 also produces at the anode 55 a more positive potential which is applied through the lead 43 to the gate 28 and to the switch output control gate which corresponds to the tubes 90 and 94 and is contained in the box 109. As a result there are supplied from the generator 27 to the input capacitor 19 a number of pulses depending on the setting of the switch in the box 109 (this switch is like the switch S1) and on the settings of the switches S2' to S4'.

When such number of pulses has been completed, a positive pulse (derived from the switch and switch control circuit which is the box 109 and has the same connections as S1 and tubes 90, 94, 104 and 110) is applied through a lead 55 and the switch 52 to the right hand grid of the trigger circuit V5. As a result the gates 26 and 90—94 are opened as explained above and the gates associated with the generator 27 are closed so that pulses of a number dependent on the setting of the switches S1 to S4 are again delivered from the generator 26.

This cycle of operation continues so long as the setting of the selector switches is not changed. As a result, there is produced at the anode 55 of the trigger circuit V5 a potential of square wave shape. As previously explained, the time interval of the positive loop of this potential varies with change in the frequency of the generator 27 and the negative loop of this potential has a constant time interval for the reason that the frequency of the generator 25 is maintained constant. The positive loop is detected by the detector 44 and applied to the frequency control element of the generator 27 in a conventional manner to maintain a substantially constant ratio between the frequencies of the two generators.

In order to make the connections of Fig. 5 like those of Fig. 3, the switches 51, 52, 56, 53, 54 and the corresponding feedback switches of the frequency divider sections 83, 84 and 85 (not shown) are opened, and the switches 50, 48, 49 and the corresponding feedback switches of the sections 83, 84 and 85 (not shown) are closed.

Under these conditions, the triode 34 and the corresponding triodes of the sections 83, 84 and 85 are made conductive when current conduction is in the anode 56 of the trigger circuit V5 and the triode 33 and the corresponding triodes of the sections 83, 84 and 85 are made conductive when current conduction is in the anode 55 of the trigger circuit V5. In this way the capacity of the frequency changer is made to alternate between two fixed values each time the frequency completes its cycle of operation and a negative pulse is applied through the capacitor 88 and the switch 50 to the trigger circuit V5. The gates 26 and 28 and the detector 44 continue to operate as described above.

It is apparent that the feedback connections of the frequency divider may be other than those indicated and that suitable switching means may be provided for selecting such predetermined groups of the feedback connections as are required to accommodate different relations between the frequencies of the two generators.

What the invention provides is an improved automatic frequency control system wherein pulses from fixed and variable frequency sources are alternately supplied to a frequency divider which (1) is connected to have different division ratios for the pulses from the different sources and (2) functions to provide an output potential of square wave form having positive loops or half-cycles which have a time interval dependent on the frequency of the variable frequency source and are detected for maintaining a substantially constant relation between the frequencies of the two sources.

What is claimed is:

1. The combination of sources of fixed and controllable frequency, a frequency divider having an output lead, first and second division ratio selector means connected to said divider for adjusting the connections of said divider to divide said fixed and controllable frequencies by divisors such that the resultant quotients are in the form of pulses unequally spaced in time only as a result of slight variations in said controllable frequency, control means connected to said output lead and responsive to said pulses for alternately connecting said sources to said divider, and means connected to said controllable frequency source and responsive to an output potential of said control means for maintaining a substantially constant relation between said frequencies.

2. The combination of sources of fixed and controllable frequency, a frequency divider having an output lead, first and second division ratio selector means connected to said divider for adjusting the connections of said divider to divide said fixed and controllable frequencies by divisors such that the resultant quotients are in the form of pulses unequally spaced in time only as a result of slight variations in said controllable frequency, control means connected to said output lead and responsive to said pulses for alternately connecting said sources to said divider through said selector means, and means connected to said controllable frequency source and responsive to an output potential of said control means for maintaining a substantially constant relation between said frequencies.

3. The combination of sources of fixed and controllable frequency, a frequency divider having an output lead, first and second division ratio selector means connected to said divider for adjusting the connections of said divider to divide said fixed and controllable frequencies by divisors such that the resultant quotients are in the form of pulses unequally spaced in time only as a result of slight variations in said controllable frequency, control means connected to said output lead and responsive to said pulses for alternately connecting said sources to the input of said divider, and means connected to said controllable frequency source and responsive to an output potential of said control means for maintaining a substantially constant relation between said frequencies.

4. The combination of sources of fixed and controllable frequency, a frequency divider having an output lead, first and second division ratio selector means connected to said divider for adjusting the connections of said divider to divide said fixed and controllable frequencies by divisors such that the resultant quotients are in the form of pulses unequally spaced in time only as a result of slight variations in said controllable frequency, control means connected to said divider through said selector means and responsive to said pulses for alternately connecting said sources to the input of said divider, and means connected to said controllable frequency source and responsive to an output potential of said control means for maintaining a substantially constant relation between said frequencies.

5. The combination of sources of fixed and controllable frequency, a frequency divider having an output lead, first and second division ratio selector means connected to said divider for adjusting the connections of said divider to divide said fixed and controllable frequencies by divisors such that the resultant quotients are in the form of pulses unequally spaced in time only as a result of slight variations in said controllable frequency, control means connected to said divider through said selector means and responsive to said pulses for alternately connecting said sources to the input of said divider, means connected to said controllable frequency source and responsive to an output potential of said control means for maintaining a substantially constant relation between said frequency, and means connected to respond to each of said pulses for resetting said divider.

IGOR E. GROSDOFF.

No references cited.